(12) United States Patent
Nember

(10) Patent No.: US 6,655,410 B2
(45) Date of Patent: Dec. 2, 2003

(54) MULTI-WAY HYDRAULIC DISTRIBUTOR WITH AN INTERCEPTION UNIT

(75) Inventor: Oscar Nember, Brescia (IT)

(73) Assignee: Rubinetterie Zipponi di Nember Oscar, Brescia (IT)

(*) Notice: Subject to any disclaimer, the term of this patent is extended or adjusted under 35 U.S.C. 154(b) by 29 days.

(21) Appl. No.: 10/060,499

(22) Filed: Jan. 30, 2002

(65) Prior Publication Data

US 2003/0140973 A1 Jul. 31, 2003

(51) Int. Cl.[7] ............................................. F16K 11/085
(52) U.S. Cl. ............................. 137/625.11; 137/614.17
(58) Field of Search ........................ 137/625.11, 635, 137/614.17

(56) References Cited

U.S. PATENT DOCUMENTS

| | | | | |
|---|---|---|---|---|
| 2,609,207 A | * | 9/1952 | Van Sickle ................ | 137/635 |
| 2,700,984 A | * | 2/1955 | Gleasman ............... | 137/625.11 |
| 2,979,082 A | * | 4/1961 | Neves .................... | 137/625.11 |
| 3,520,327 A | * | 7/1970 | Claydon ................ | 137/625.11 |
| 3,665,952 A | * | 5/1972 | Chronister ............. | 137/625.11 |
| 3,840,046 A | | 10/1974 | Busquets | |
| 4,178,963 A | * | 12/1979 | Riefler et al. .......... | 137/625.11 |
| 4,538,640 A | * | 9/1985 | Acker .................... | 137/625.11 |
| 5,123,449 A | * | 6/1992 | Nowicki ................ | 137/625.11 |

* cited by examiner

Primary Examiner—John Rivell
(74) Attorney, Agent, or Firm—McGlew and Tuttle, P.C.

(57) ABSTRACT

This invention relates to a hydraulic, multi-way distributor comprising a body (10) with a water inlet passage (11) and several water outlet ways (12) towards just as many uses. A rotary diverter device (13) in said body is provided with an axial hole (16') communicating with the water inlet passage and a lateral opening (16) designed to be positioned far away from or fully or partially in line with at least one of said outlet ways, in order to intercept the inlet water flow and to distribute water flow towards said uses, selectively.

6 Claims, 1 Drawing Sheet

MULTI-WAY HYDRAULIC DISTRIBUTOR WITH AN INTERCEPTION UNIT

FIELD OF THE INVENTION

This invention concerns the general taps and fittings sector and refers especially to a multi-way distributor or diverter for plumbing systems.

STATE OF THE ART

Multi-way hydraulic deviators to selectively distribute a water inlet flow to several outlets through a rotating distributor component have already been proposed.

For example, U.S. Pat. No. 3,840,046 discloses a fluid mixing an a diverter valve which ha a hollow body closed at one end with a tapered bore, hot and cold water inlets, a spout outlet, a spray outlet and a shower outlet. Within the body is rotatably lodged a tapered selector which has a series of passages adapted on selective rotation so as to communicate with said inlets and with one of the outlet, selectively. A cylindrical valve is mounted for axial adjustments within the selector valve for controlling the amount of hot and cold water entering the cylindrical valve and the mixing chamber therein. Longitudinally adjustable and rotative valve stem extends through and is axially secure to the cylindrical valve for longitudinal adjustments in unison and at the same time slideably keyed to the rotative valve. A control lever is connected to said stem and designed for causing rotary movements of the selector valve and axial adjustment of the cylindrical valve. However, such a fluid mixing and diverter valve is very complicated and expensive.

OBJECT AND SUMMARY OF THE INVENTION

An object of this invention is to provide a multi-way hydraulic distributor or diverter in a new and simpler conformation with fewer pieces, more economical to make, of certain functionality and reliable.

This object is achieved with a multi-way hydraulic distributor o diverter which includes a body having a water inlet passage and several water outlet ways towards just as many uses, and comprises a deviator device with rotary fitting in the said body and having an axial hole communicating with said water inlet passage and a lateral opening designed to be positioned far away from or fully or partially in line with at least one of the said outlet ways, following rotation of the deviator device in order to intercept the inlet water flow and to selectively distribute it towards the said uses.

BRIEF DESCRIPTION OF THE DRAWINGS

Further details of the invention will be more apparent from the following specification and making reference to the enclosed, indicative and non-limiting drawings, in which.

DETAILED DESCRIPTION OF THE INVENTION

Figure 2:
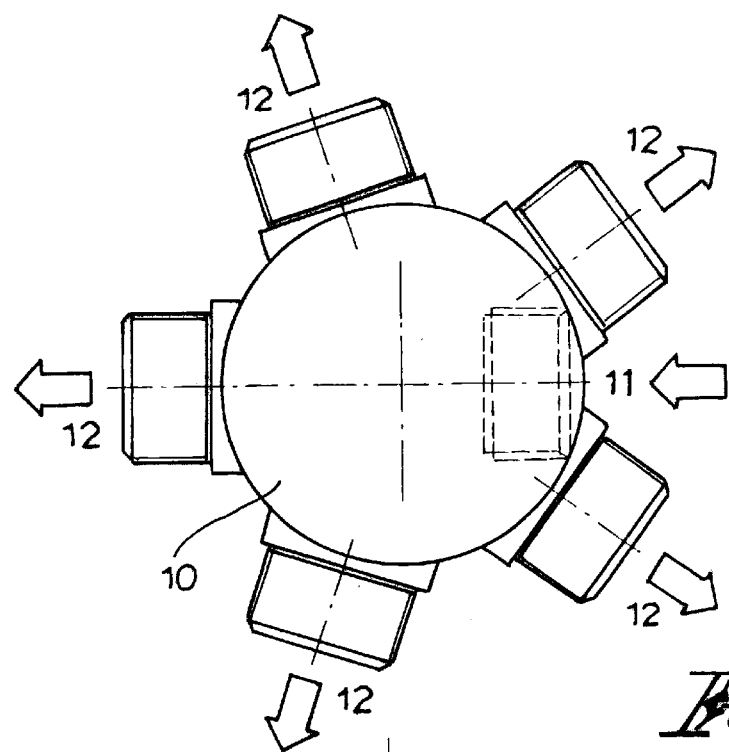
FIG. 2 shows a schematic view from above of the distributor in FIG. 1.
Figure 1:
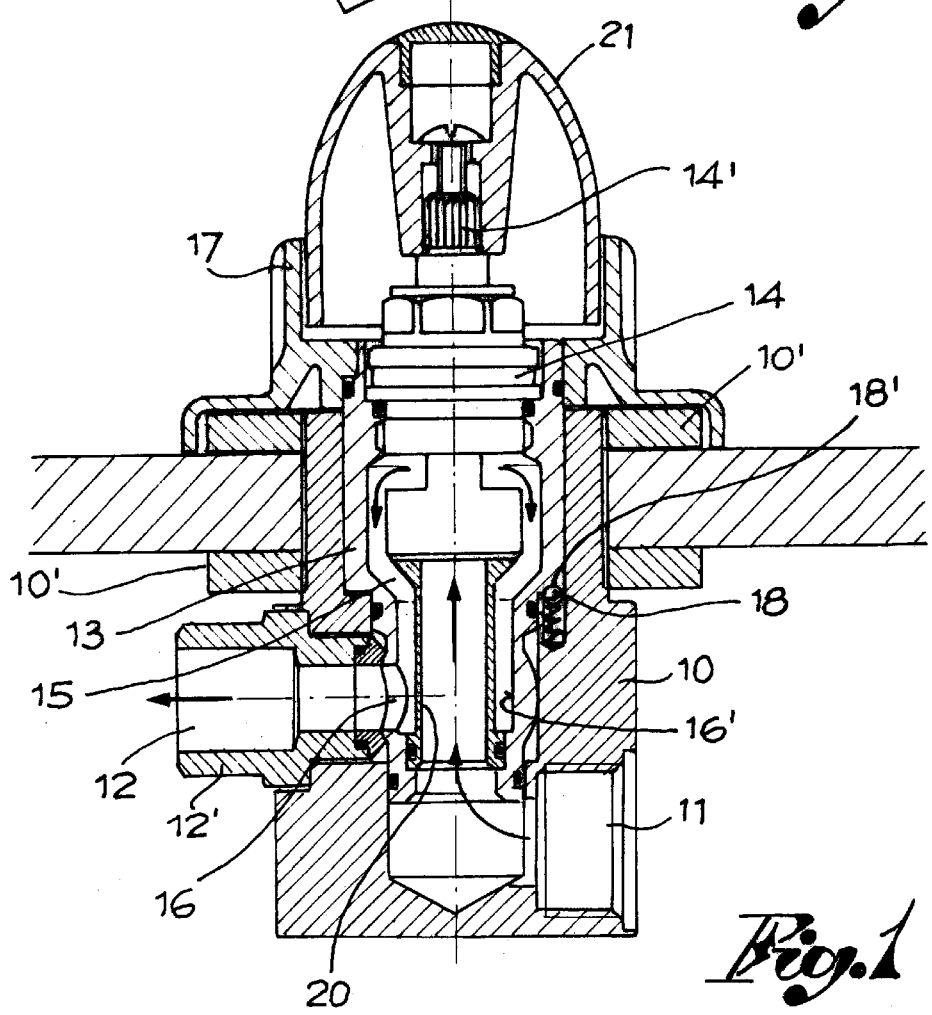
FIG. 1 shows the axial section of a multi-way distributor according to the finding.

The distributor as illustrated, includes a body 10, in which there are formed an inlet passage 11 at a first level and several water passages 12 at another level, each provided with a fitting 12' for connection to a respective use. The body has one external threaded part, provided with two nuts 10' to fit the distributor to a surface or support wall.

Inside the body 10, there are located a diverter device 13 to direct the incoming water flow towards each of the outlet ways 12 and a valve type device 14, which is inserted coaxially inside the diverter 13 for partially or totally opening and closing the water inlet passage 11.

The diverter device 13 has a hollow body, with an axial hole 16' and a lateral opening 16 executed at the level of the outlet ways 12. This diverter device is susceptible to rotation around its geometric axis to place lateral opening 16 in line with at least one outlet way, excluding the remaining ones. For its rotation, the diverter device 13 presents a head portion protruding from the body 10 of the distributor, coupled with a manoeuvre knob 17. In order to obtain the easy and correct positioning of the lateral opening 16 with respect to each of the outlet ways 12, in body 10 of the distributor, a stop ball 18, driven by spring 19 is foreseen. This stop ball engages the cavities 18' made in the diverter device 13, in line with each outlet way.

The valve type device 14 is connected to and communicates with the water inlet passage 11, through a channel conduit 20, located in axis with the valve type device and coaxial to the diverter 13. This conduit 20 extends towards the valve type device 14, starting from the opening of the diverter 13, directed towards inlet 11. At the outlet, the valve type device communicates with an annular channel 15 that arrives at the lateral opening 16 of the diverter. This channel is delimited by diverter 13 at the outside, with the valve type device 14 and the conduit 20 at the inside, so that the water entry passage 11 never directly communicates with any outlet way 12. The valve type device 14 can be of the screw type with ceramic plates or have other means to partially or totally close and open the water inlet 11. To be operated, the valve type device 14 has a head fitting 14, protruding from the body 10 that can be coupled with a second knob 21.

In practice, the amount of inlet water passes through the central conduit 20 and the valve type device 14, and from here it is deviated towards an outlet way, through lateral opening 16 in the diverter device 13.

It should be noticed that this lateral opening 16 may also be partially lined up with two outlet ways 12, to distribute the water towards two uses at the same time.

To be noted that the distributor could also be without valve type device 14. In this case, the diverter acts as a shutter when its lateral opening 16 is located far from outlet ways 12 and perhaps equipped with a distributor body seal gasket.

What is claimed is:

1. A hydraulic, multi-way distributor comprising:
   a body with a water inlet passage and several water outlet ways, each of the outlet ways being associated with a sanitary or household use, said body defining a diverter space;
   a diverter device rotatably fitted in said body and provided with an axially extending passage communicating with said water inlet passage and a lateral opening that may be positioned fully or partially in line with at least one of said outlet ways upon rotation of the diverter device to intercept the inlet water flow and to distribute water flow towards said uses selectively;
   a valve device; and
   a conduit extending within said diverter device and providing an interior passage connecting said axially extending passage to said valve device and cooperating with said diverter device to define an annular passage between said conduit and said diverter device from said valve device to said lateral opening.

2. A hydraulic, multi-way distributor comprising:

a body with a water inlet passage and several water outlet ways each for a different use;

a diverter device rotatably fitted in said body and provided with an axial hole communicating with the water inlet passage and a lateral opening to be disposed away from or fully or partially in line with at least one of said outlet ways upon rotation of the diverter device to intercept the inlet flow of water and to distribute water flow towards the one or more of the uses selectively;

a valve device associated with said diverter device for the full or total opening or closing of said water inlet passage; and an axially extending connection conduit extending within said diverter device and providing an interior passage connecting said axially extending passage to said valve device and cooperating with said diverter device to define an annular water transit channel between said conduit and said diverter device from said valve device to said lateral opening.

3. A hydraulic distributor according to claim 2, wherein said diverter device and said valve device are coaxial, said valve type device communicating at an entry side with said axially extending conduit to a water inlet passage and on an exit side with said annular water transit channel, towards said lateral opening of the water flow diverter, for supplying water selectively to the outlet ways.

4. A hydraulic distributor according to claim 2, wherein said diverter control knob is coaxial to said valve control knob and surrounds at least a portion of said valve control knob.

5. A hydraulic, multi-way distributor comprising:

a body with a water inlet passage and several water outlet ways each for a different use;

a diverter device rotatably fitted in said body and provided with an axial hole communicating with the water inlet passage and a lateral opening to be disposed away from or fully or partially in line with at least one of said outlet ways upon rotation of the diverter device to intercept the inlet flow of water and to distribute water flow towards the one or more of the uses selectively;

a valve device associated with said diverter device for the full or total opening or closing of said water inlet passage;

an axially extending connection conduit extending coaxially to said diverter device within said diverter device and providing an interior passage connecting said axially extending passage to said valve device and cooperating with said diverter device to define an annular water transit channel between said conduit and said diverter device from said valve device to said lateral opening;

a valve control knob connected to said valve device for controlling the valve device and controlling water flow from said axial hole to said lateral opening; and a diverter control knob connected to said diverter for controlling the rotational position of the diverter to control water from said water inlet passage to each of said several water outlet ways.

6. A hydraulic distributor according to claim 5, wherein said diverter control knob is at a same side of said diverter as said valve control knob.

* * * * *